Dec. 15, 1964   M. JUSTINIEN ETAL   3,161,185
ELASTICALLY CONNECTED PISTONS FOR THE AUTOMATIC
ADJUSTMENT OF VOLUMETRIC COMPRESSION RATIOS
Filed Nov. 7, 1962   4 Sheets-Sheet 1
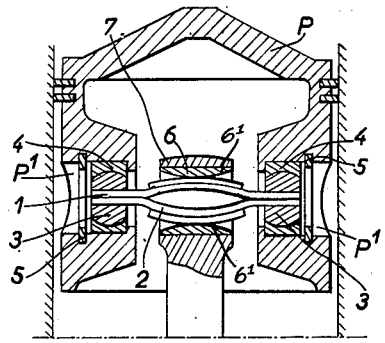
*Fig.1*
*Fig.2*
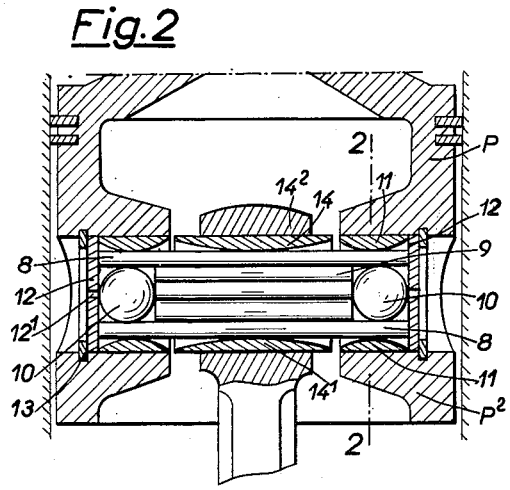
*Fig.3*
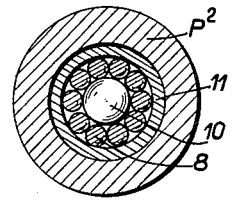
*Fig.4*
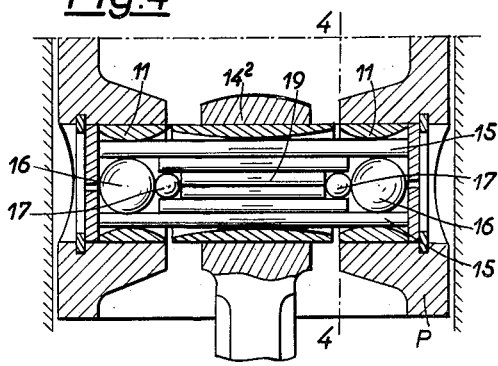
*Fig.5*
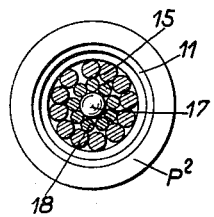

Dec. 15, 1964 M. JUSTINIEN ETAL 3,161,185
ELASTICALLY CONNECTED PISTONS FOR THE AUTOMATIC
ADJUSTMENT OF VOLUMETRIC COMPRESSION RATIOS
Filed Nov. 7, 1962 4 Sheets-Sheet 3
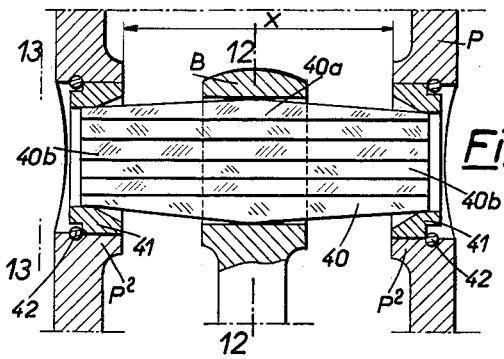
Fig.12
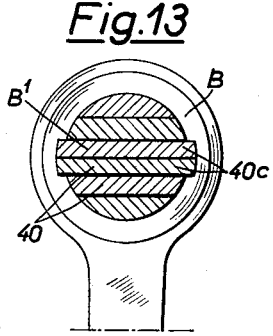
Fig.13
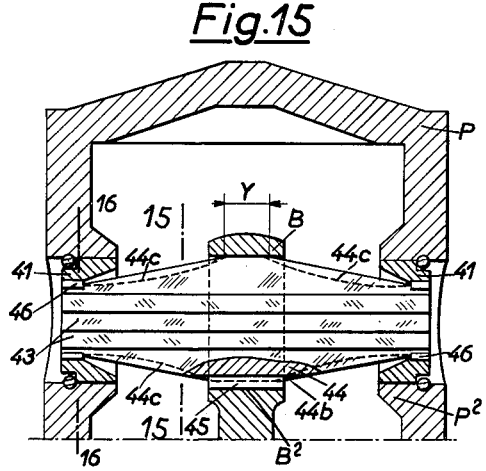
Fig.15
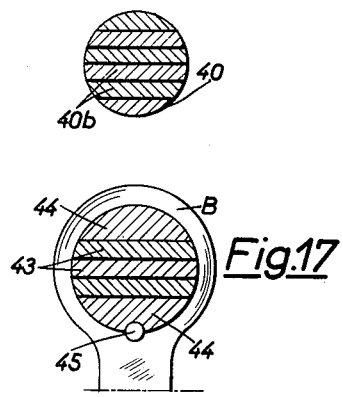
Fig.14
Fig.17
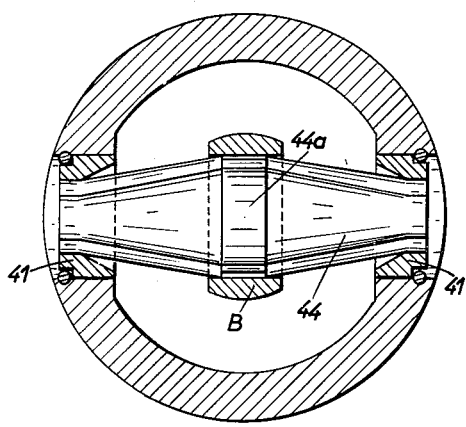
Fig.16
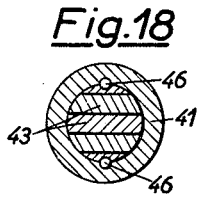
Fig.18

United States Patent Office 3,161,185
Patented Dec. 15, 1964

3,161,185
ELASTICALLY CONNECTED PISTONS FOR THE AUTOMATIC ADJUSTMENT OF VOLUMETRIC COMPRESSION RATIOS
Marcel Justinien, 20 bis Rue Jouvenet, and François de Chabot, 120 Rue du Bac, both of Paris, France
Filed Nov. 7, 1962, Ser. No. 235,941
Claims priority, application France, Nov. 17, 1961, 8,326; July 3, 1962, 8,481
17 Claims. (Cl. 123—78)

This invention relates to elastically connected pistons in internal combustion engines.

In internal combustion engines and in particular in the case of automobile engines, various proposals have been made for providing an elastic connection in the connecting rod assembly which is constituted of the piston and the connecting rod which is coupled to the crankshaft. Such an elastic connection allows, on the one hand, an automatic adjustment of the volumetric ratio in proportion to the volume of gases admitted into the cylinders and, on the other hand, it improves the adaptability of the engine by dampening the very hard shocks produced by the fuel explosions.

However the proposals made hitherto have not been put into practice since they fail to meet during protracted use, the very hard conditions of operation.

It is therefore desirable and constitutes an object of the invention to meet such hard conditions of operation by providing pistons which adjust automatically the volumetric ratio in the compression chamber by fitting said pistons with dampening elastic pins.

The fact should be stressed that the desired elasticity thus obtained eliminates the usual vibrations of the engine because the elasticity of the piston pin limits the shifting of the piston to the minimum well-defined amplitude required. We have reached this result firstly by examining a number of embodiments of elastic piston and connecting rod systems and then by designing an elastic pin constituted by a novel non-prestressed spring arrangement.

By reason of this mounting of a spring without any prestressing, there is no loss of compression during use, which loss might lead to a floating movement similar to a vibration movement.

We will now disclose the invention in further detail, reference being made to the accompanying drawings showing embodiments given by way of example. In said drawings:

FIG. 1 is a diametrical sectional view on a reduced scale of a piston of an internal combustion engine fitted inside a cylinder and equipped with an elastic pin constituted by two spring blades the concavities of which face each other.

FIG. 2 is a diametrical sectional view of the piston of FIG. 1 on an enlarged scale equipped with an elastic pin constituted by elastic rods of different lengths which are suitably housed inside inwardly shaped rings and abutting longitudinally against retaining balls.

FIG. 3 is a cross-sectional view through line 2—2 of FIG. 2.

FIG. 4 is a partial diametrical sectional view of a piston equipped with an elastic pin constituted by spring rods arranged in accordance with a second embodiment.

FIG. 5 is a cross-sectional view through line 4—4 of FIG. 4.

FIG. 12 is an axial cross-section of a piston in accordance with a sixth embodiment of the elastic pin.

FIGS. 13 and 14 are a lateral view and a cross-sectional view of said piston respectively along lines 12—12 and 13—13 of FIG. 12.

FIG. 15 is a partial axial cross-section of a piston connected with the top of a connecting rod by means of an elastic pin designed in accordance with a seventh embodiment.

FIG. 16 is a plan view corresponding to FIG. 15.

FIGS. 17 and 18 are cross-sectional views respectively along lines 15—15 and 16—16 of FIG. 15.

Figure 19:
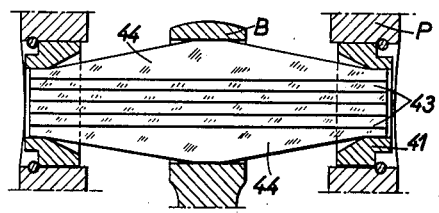

FIG. 19 illustrates an eighth embodiment of the elastic pin connecting the piston with the top of the connecting rod.

Figure 20:
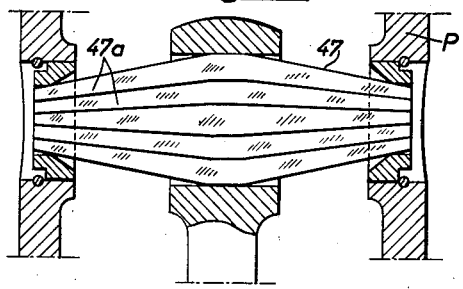
Figure 21:
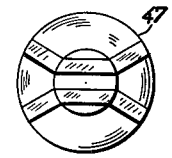

FIGS. 20 and 21 are respectively a side view and an end view of a ninth embodiment of the elastic pin.

Figure 22:
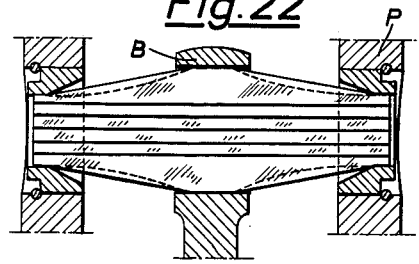
Figure 23:
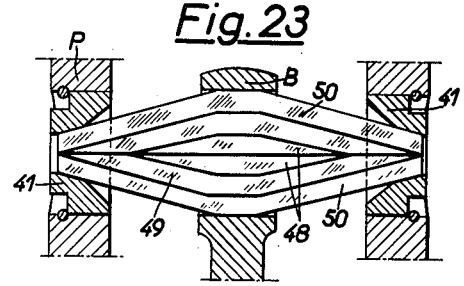
Figure 24:
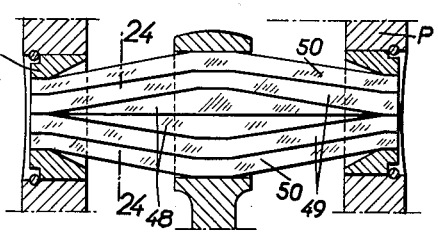

FIGS. 22, 23 and 24 illustrate still further embodiments of said elastic pin.

Figure 25:
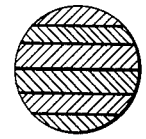

FIG. 25 is a cross-sectional view through line 24—24 of FIG. 24.

Figure 26:
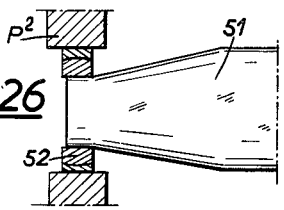

FIG. 26 illustrates an arrangement of a universal fitting for either end of an elastic pin.

In the embodiments illustrated which are given solely by way of example, the piston providing self-adjustment of the volumetric ratio includes an elastic pin the ends of which are held in diametrically opposed spaced bosses formed on a skirt on the piston body, said pin being fitted in the top of the connecting rod controlling the crankshaft.

Said elastic pin is constituted mechanically in a manner such as to provide a vertical elasticity, that is an elasticity allowing a relative displacement of the piston with reference to the connecting rod thereby permitting adjustment of the volumetric ratio of the compression chamber while also providing greater adaptability in operation as a result of elastic dampening.

Turning first to the embodiment illustrated in FIG. 1, the elastic pin may be constituted by only one spring blade but is preferably a composite body constituted by a superposition of blades 1 and 2 of a concave shape. Said springs 1 and 2, the concavities of which face each other, are arranged symmetrically and their ends are secured in housing 3 which may be fixedly supported or else be adapted to be radially displaced, said housings being formed in the rings 4 which slide freely inside the bores $p1$ formed in the bosses of the piston $p$, so as to allow a modification in length of the spring blades 1 and 2 when elongated. Stop washers 5 held through their own elasticity inside corresponding grooves of the bore $p1$ hold the pin in position.

The inner central sections of the springs 1 and 2 have concavities facing each other and they are centrally carried in a cylindrical ring or bushing 6 adapted to revolve freely in the bore formed in the top of the connecting rod 7. It should be noted also that the spring blades 1 and 2 engage the inner surface of the ring 6, along the incurved convex surfaces $6^1$ of the latter, which ensures a tangential bearing of the springs, whatever may be the deformation of the springs.

Obviously the blade springs may be given any desired shapes and cross-sections and the number of blades may be other than two. As a matter of fact, the lower spring which is subjected to the thrust at the moment of the fuel explosion may be reinforced either by providing a larger number of blades, or else by giving the blades a larger section. Similarly, for certain engines, a single spring-blade of suitable outline and cross-section may be utilized.

In the embodiment illustrated in FIGS. 2 and 3, the elastic pin is constituted by a plurality of superposed elastic rods having preferably a round cross-section.

Said elastic rods, made of any suitable mechanically resistant material, include longer peripheral rods 8, the elasticity of which is such that a sufficient sag is obtained and a concentric system of central rods 9 which are shorter and serve as a reinforcement.

The ends of the peripheral rods 8 are held in circular arrangement around balls 10 of a particular diameter. The balls also form buffers for the transmission of the thrust between the piston and the connecting rod. The outer ends of the peripheral rods 8 are centrally fitted inside the bores of rings 11. The rings 11 have a convex longitudinal cross-section facing the rods 8. The rings 11 are fitted in turn in the bosses $p^2$ of the piston $p$.

The central rods 9 which are arranged annularly inside the peripheral rods are held longitudinally at their ends, by the balls 10 which form stops for rods 9 and also reduce or even eliminate friction.

The elastic pin thus formed is also held longitudinally at its ends, by washers 12 centrally carried inside the bosses $p^2$ of the piston $p$ and held in position by annular members 13. It should be noted furthermore that the washers 12 are provided with transverse ports $12^1$ for the passage of the oil which is to lubricate the elastic pin.

The top of the connecting rod $14^2$ engages, in a bore provided therein, the periphery of the central ring 14 which is centered over and fitted around the peripheral rods 8 so that the connecting rod may rotate around said central ring. The longitudinal cross-section of the central ring 14 is provided with a radius of curvature $14^1$ corresponding to the maximum radius of curvature of the peripheral rods 8 when they bend, so as to allow permanent engagement between said rods and said spring.

In the embodiment illustrated in FIGS. 4 and 5, the same construction is employed as shown in FIGS. 2 and 3, but the elastic pin is constituted in this case by a plurality of concentric groups of elastic rods of different lengths, each abutting against axially arranged balls of corresponding diameters.

In said embodiment of FIGS. 4 and 5, the peripheral rods 15 are arranged annularly around the terminal balls 16 which serve as longitudinal axial stops for the balls 17 of a smaller diameter.

Said balls 17 form an annular centering bearing for the intermediate rods 18 housed coaxially inside the cage constituted by the outer rods 15. Shorter rods 19 fill the central space left free inside the group of intermediate rods, and these shorter rods abut longitudinally against the balls 17. Obviously, the outline and cross-section of the different rods 15, 18 and 19 are such as will provide a sufficient coefficient of elasticity for the compound pin thus executed.

Figure 6:
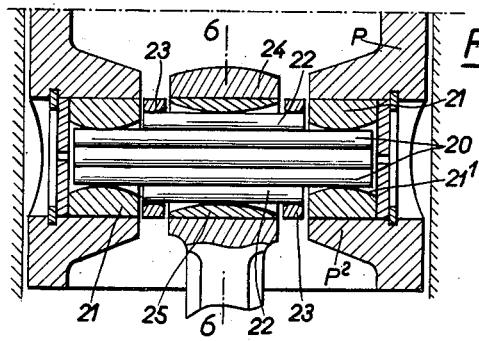
FIG. 6 is a partial diametrical sectional view of a piston equipped with an elastic pin constituted by spring rods arranged in accordance with a third embodiment.
Figure 7:
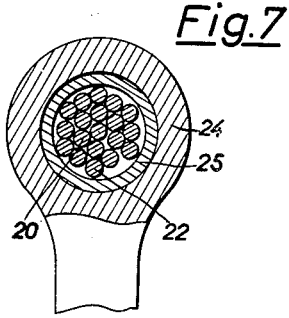
FIG. 7 is a cross-sectional view through line 6—6 of FIG. 6.

In the embodiment illustrated in FIGS. 6 and 7, the elastic pin is constituted by a plurality of elastic rods arranged in superposed concentric relationship. The central section of the pin includes longer rods 20 fitted at their ends, inside the convex bores $21^1$ of the rings 21 carried in the bosses $p^2$ of the piston $p$. Outwardly, the central sections of said longer rods 20 are reinforced coaxially by shorter rods 22 held peripherally at their ends by collars 23 or the like. In said embodiment, the top of the connecting rod 24 rotates around the periphery of the central ring 25 fitted coaxially around the shorter rods 22.

Obviously, in the embodiments of FIGS. 6 and 7, the rods may be given different cross-sectional shapes and sizes and they may be made of any suitable metal or other material. The free spaces between the rods may be filled by rods of a smaller cross-section. Similarly, any centering and securing means annularly holding the rods in position may be used instead of those illustrated.

It is also possible to employ elastic rods assembled together by any suitable or known means, by forming for instance a twisted elastic system constituted by rods of suitable cross-sections.

Figure 8:
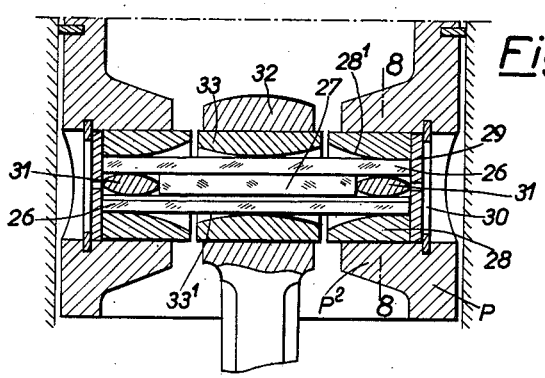
FIG. 8 is a partial diametrical sectional view of a piston of an internal combustion engine, which piston is equipped with an elastic pin constituted by an assembly of spring blades of different lengths in accordance with a fourth embodiment.
Figure 9:
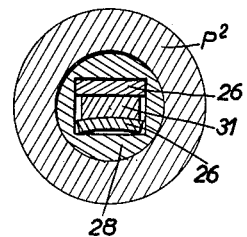
FIG. 9 is a cross-sectional view through line 8—8 of FIG. 8.

In the embodiment illustrated in FIGS. 8 and 9, the elastic pin is constituted by suitably arranged and positioned spring blades of different lengths.

The outer spring blades 26 have flat lateral surfaces which are separated from each other by a shorter intermediate blade 27. The ends of said spring blades 26 are fitted in the convex bores $28^1$ of the rings 28 which revolve freely inside the bosses $p^2$ of the piston $p$. The washers 29 held in position by annular members 30 constitute longitudinal abutments for the ends of the pin. It should be noted that the intermediate blade 27 is held in position through the agency of the shaped buffer members 31 fitted between the outer spring blades 26 so as to ensure their interconnection. Said shaped buffer members 31 are formed advantageously, but not necessarily, by blade sections cut to the desired size.

It is also possible to give the spring blades 26 a transverse cross-section which is slightly arcuate, so as to allow their elastic transverse engagement inside the rings 28. Said arrangement, as illustrated in FIG. 9, allows an automatic compensation of the clearances between adjacent blades.

The top portion 32 of the connecting rod is secured to the elastic pin through the agency of a central ring 33 provided with a longitudinal opening $33^1$ the shape of which corresponds to that of the cross-section constituted by the assembly of the superposed spring blades 26 and 27. Said opening $33^1$ in the central ring 33 is designed furthermore with a convex longitudinal outline so as to allow the desired bending and deformation of the elastic pin.

Figure 10:
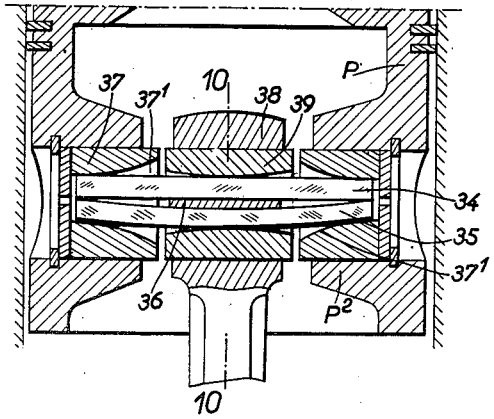
FIG. 10 is a partial diametrical sectional view of a piston of an internal combustion engine, equipped with an elastic pin constituted by an association of straight and incurved spring blades of equal lengths in accordance with a fifth embodiment.
Figure 11:
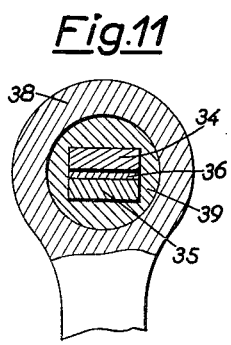
FIG. 11 is a cross-sectional view through line 10—10 of FIG. 10.

In the embodiment illustrated in FIGS. 10 and 11, the elastic pin includes a rectilinear spring blade 34 superposed over an incurved blade 35 of equal length. A shaped buffer member 36 arranged axially between the blades ensures the transmission in a vertical direction of the stresses applied alternatingly on each of the blades 34 and 35, as the piston operates.

The spring blades 34 and 35, of any suitable outline and cross-section, are accommodated at their ends in the shaped bores $37^1$ in the rings 37 which revolve freely in the bosses $p^2$ of the piston $p$. As in the case of the preceding embodiment, the top of the connecting rod 38 is secured to the elastic pin through the agency of a central ring 39 provided with a longitudinally shaped opening which allows the passage of the spring blades and their free bending.

It should also be noted that, in the case of elastic pins constituted by spring blades, said pins are fitted in the piston in a manner which allows them to oscillate to a limited extent, whereby angular movements of the connecting rod are allowed. Said oscillations should however be limited so that the thrust is always exerted on the bearing surfaces of the spring blades and never on their edges.

In the different embodiments of elastic pins as disclosed hereinabove, it is important to note that the bosses $p^2$ of the piston $p$ have a reduced axial length which increases substantially the spacing between the two bosses, which feature allows a reduction in the weight of the piston.

Turning now to FIGS. 12 to 18, these figures disclose arrangements and shapes which have been designed so as to provide lighter and perfectly operative shapes for the elastic pins and associated pistons. Such pins eliminate vibrations in the engine, by reason of the flexibility they provide between the piston and the connecting rod.

In the embodiments illustrated in FIGS. 12, 13 and 14 the elastic pin is constituted by a plurality of blades 40 exhibiting the following features:

(1) the cross-section of the pin is at its maximum in the medial section 40a of the length of the pin, beyond which the cross-section decreases gradually towards the ends of the pin at 40b. This corresponds to a shape, which offers better resistance against stressing and bending moments which are at a maximum in the medial section of the pin length, that is, at the point engaged in the top of the connecting rod. Thus, it is possible to reduce the cross-section of the outer ends of the elastic pin, the weight of which is thus reduced. The importance of this arrangement is apparent since the pin which is a moving part, has thereby a reduced inertia, and the unnecessary strain produced by an excess weight is thus reduced without the mechanical resistance of the pin being by any means impaired, said resistance being generally even increased thereby.

(2) the number and thickness of the blades 40 may vary.

(3) the elastic pin constituted by an assembly of superposed blades, has a circular cross-section throughout its length. The blades are obviously shaped correspondingly; the shape of the rings is thus simplified as well as are the housings for the pin ends in the bosses of the piston and the medial section of the pin in the connecting rod.

(4) in order to prevent any angular shifting of the blades as a consequence of the circular shape of the cross-section of the pin, it is possible, according to a first modification (FIG. 13), to provide grooves B1 in diametrically opposed relationship in the top of the connecting rod B. The depth of said grooves corresponds to the thickness of one or more medial blades 40c having a corresponding breadth. Thus, the thrust exerted on the elastic blades is always perpendicular to said blades.

(5) in the embodiments of the pin according to which its ends are tapering, the shifting of the pin may be obtained within the connecting rod B without the opening in the ring carried inside said top having a curved flaring shape. The rings 41 provided for the fitting of the pin inside the bosses $p^2$ of the piston $p$ have a frusto-conically flaring shape. The tapering shape of the ends of the pin, eliminates the necessity of washers or like abutments axially beyond the rings 41 which are held in position for instance by the annular members 42 or by spring washers.

(6) the bosses $p^2$ of the piston $p$ are much shorter than the bosses of the pistons used in conventional arrangements, which leads to a larger spacing between the outer terminal surfaces of the bosses (as shown at $x$ in FIG. 12). This results in a substantial reduction in weight for the piston, which compensates for the increase in weight of the elastic pin. It should be understood, as a matter of fact, that the ends of the elastic pin do not require being supported over comparatively considerable lengths, in contradistinction with conventional assemblies. It is sufficient for the ends of the elastic pin to be positioned inside the bosses $p^2$ of the piston $p$, and to be comparatively free in their movements.

In the embodiment illustrated in FIGS. 15 to 18, the above features are to be found again, but it should be noted that the elastic pin is constituted in this embodiment by a plurality of inner blades 43 of equal thicknesses, whereas the outer blades 44 have a substantially greater thickness. It is thus possible to adjust the flexibility of the elastic pin according to the characteristics of the engines incorporating them, by modifying the thickness of the inner thinner blades which are more numerous than the outer thicker blades as illustrated for instance in FIGS. 15 to 22.

Further features of the embodiments in FIGS. 15 to 18 will be readily apparent as follows:

(1) the blades forming the elastic pin and chiefly the outer blades 44 are provided at 44a (FIG 16) with a cylindrical bearing surface engaged in the bore in the upper end of the connecting rod B or in a ring fitted in said bore. However, and as illustrated in the drawings, the breadth of said bearing surface is smaller than the breadth of the upper end of said connecting rod B. Said arrangement allows a free bending of the blades with reference to the upper end of said connecting rod.

(2) the angular positioning of the blades with reference to the top of the connecting rod and to the piston is ensured in a simple manner, through the keying obtained by round rods 45 one half of which are housed in a corresponding groove 44b of one or both thicker blades 44, and the other half of which is housed in a groove B2 formed in the top of the connecting rod. Similiar keys formed by round rods 46 may also engage the ends of the elastic pin so as to make the ends of the blades 44 rigid with the rings 41. In such a case, the rings 41 may revolve inside the bosses $p^2$ of the piston $p$.

(3) it is possible, as shown in dotted lines in FIG. 15, to give the outer blades 44 a concave shape at 44c between the bearing surface 44a and the end bearing surfaces engaging the rings 41. Such a shape provides the advantage of reducing the weight of the elastic pin and of increasing its flexibility while said pin retains entirely its mechanical resistance in the medial section subjected to the major stresses.

Turning now to FIGS. 20 and 21, the arrangement is similar to that disclosed hereinabove, and the elastic pin once again has a circular cross-section the area of which decreases gradually between the medial part of the pin and its ends.

However, in said FIGS. 20 and 21, the following novel features are to be found:

(1) the pin 47 has a very marked frusto-conical outline and the ends of the pin have a cross-sectional area which is approximately one half that of the medial section of the pin. Said ratio is very significant since it corresponds to the actual variation of the stresses applied, accordingly, there is provided maximum resistance in the medial section of the pin with considerable flexibility at the ends of the pin. Such a pin provides the best properties for a minimum weight.

(2) the thickness of each of the blades 47a varies similarly in the same manner with the size of the cross-section of the pin. The thickness of each blade is about twice larger in the medial portion of its length than at the ends.

(3) the breadth of the blades is reduced in the same ratio, as is the thickness, with reference to their length.

In the embodiments illustrated in FIGS. 23 and 24, the inner central blades 48 have a thickness decreasing outwardly and their ends lie in a receding position with reference to the ends of the elastic pin. The blades 49 lying to either side of said inner blades 48 may be formed in a manner as shown in FIG. 23, or else their thickness may be uniform throughout the length of the elastic pin. The outer blades 50 are arranged as precedingly disclosed.

The ends of the elastic pins may be fitted with frusto-conical wedging inside the rings 41 (FIG. 23) or else inside a cylindrical bearing formed in said rings (FIG. 24). In all cases, the axial housing of the rings 41 has a flared or frusto-conical shape facing the end of the connecting rod, so as to allow the blades to move elastically.

The embodiments illustrated in FIGS. 23 and 24 allow for reinforcement and increased thickness for the medial section of the elastic pins, which medial section is subjected to maximum stress.

FIG. 26 shows a further arrangement for supporting the ends of the elastic pins, wherein the ends of the blades, illustrated as a whole by their general outline 51, are fitted in a ring 52 fitted in the bosses $p^2$ of the piston $p$ and the inner surface of which is part spherical whereby a universal joint is obtained.

It is possible to form these part spherical socketed rings 52, as well as the rings 41 of the preceding embodiments and the bushing adapted to accommodate the top of the connecting rod of any suitable elastic material such as the material sold under the registered trade name Viton, having an elasticity which offers a high resistance, with a view to associating the elastic action of said rings with that of the elastic pin.

It should also be mentioned that many modifications of the elastic pins referred to hereinabove, are possible while retaining the advantageous features of the invention as defined in the accompanying claims, the required mechanical resistance being obtained in all cases in association with a flexibility which varies according to the type of automobile to be equipped. For instance, a greater flexibility of the elastic pins is desirable for a touring car for which flexibility is as important as extra power, whereas for high speed engines for the so-called "sporting cars" a less flexible or harder connection is preferable, since efficiency is the primary object.

A great advantage of the elastic pins having the tapering section at the ends consists in that it is possible to reduce substantially the size of the piston bosses carrying them and it is even possible to substantially eliminate them. Consequently the systems including the connecting carrying them and it is even possible to substantially eliminate them. Consequently, the connecting rod assembly constituted of the connecting rod, the piston and the pin assembled in accordance with the invention, are lighter than corresponding conventional systems, while even further reduction in weight is possible by reducing the breadth of the top portion of the connecting rod.

Lastly, it is also possible to substitute rollers for the balls described hereinabove which constitute bearings for the blades forming the elastic pins. Said substitute rollers, preferably are steel rollers having suitable size and the diameter according to the stepped arrangement of the particular blade structure.

What we claim is:

1. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures, including an outer annular series of longer elastic rods, extending into the apertures formed in the piston bosses and the medial section of which is accommodated in the top of the connecting rod, an inner annular series of reinforcing elastic rods extending within the first annular series of rods and a ball fitted inside each end of said first annular series of rods to engage the latter tangentially and to form an axial abutment for the corresponding end of the inner series of rods.

2. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures, of tapered section constituted by a plurality of superposed elastic spring blades having outer ends which are supported in the apertures of the piston bosses and having a reduced cross-sectional area, the piston pin having a medial section of larger cross-sectional area than said outer ends.

3. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures, including an outer annular series of longer elastic peripheral rods, extending into the apertures formed in the piston bosses and the medial section of which is accommodated in the top of the connecting rod, an inner annular series of rienforcing elastic rods extending within the first annular series of rods and a ball fitted inside each end of said first annular series of rods to engage the latter tangentially and to form an axial abutment for the corresponding end of the inner series of rods, a still further innermost series of rods fitted inside the first-mentioned series of inner rods and a further ball fitted inside each end of said first-mentioned inner rods between the corresponding first-mentioned ball and the corresponding end of last-mentioned further innermost series of rods to form abutments for the latter.

4. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, a bearing fitted in the aperture in each boss and having a bore widening in the direction facing the opposite boss and a piston pin fitted between the boss apertures including at least one elongated elastic element having ends carried inside the corresponding flaring bearings in the boss apertures, and an inwardly concave bushing fitted inside the connecting rod and inside which the central section of the pin is supported yieldingly in a radial direction.

5. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end hereof and each provided with a radial aperture facing the other boss, and a piston pin fitted between the boss apertures, including a bundle of elastic rods having ends supported in said boss apertures, the medial section formed by said rods being fitted in the top of the connecting rod.

6. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss aperture, including a pack of superposed spring blades having ends supported in said boss apertures, the medial section formed by said spring blades being fitted in the top of the connecting rod.

7. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin having a circular cross-section and fitted between the boss apertures, including a broad flat spring blade and a succession of flat spring blades of decreasing breadth to either side of said broad spring blade, the different blades having ends carried by said boss apertures, the medial section formed by said spring blades being fitted in the top of the connecting rod.

8. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin having a circular cross-section and fitted between the boss apertures including a broad flat spring blade and a succession of flat spring blades of decreasing breadth to either side of said broad spring blade, the thickness and breadth of each spring blade being about twice larger in its medial section than at its ends, the ends of the different blades being carried by said boss apertures, the medial section formed by said spring blades being fitted in the top of the connecting rod.

9. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures including a pack of superposed spring blades having ends carried by said boss apertures, the medial section formed by said spring blades being shaped as a cylindrical bearing having an axis which extends longitudinally of the pin and is fitted in the top of the connecting rod.

10. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures including a pack of superposed spring blades having ends which are carried by said boss apertures, the medial section formed by said spring blades being shaped as a cylindrical bearing having an axis which extends longitudinally of the pin and is fitted in the top of the connecting rod, the breadth of the cylindrical bearing surface being smaller than the breadth of the top of the connecting rod.

11. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures, including longer outer spring blades fitted between the apertures in the bosses and the medial section of which engages the top of the connecting rod and inner central spring blades fitted between the longer blades and having outer ends which have a lesser thickness than the medial section of said outer blades and terminating ahead of the ends of the outer blades.

12. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures, including at least one elongated non-precompressed elastic element having ends which are carried by said boss apertures, the medial section formed by said elements being fitted in the top of the connecting rod.

13. In combination with the combustion chamber and associated connecting rod of an internal combustion engine, the provision of a ring of yielding material resisting high temperatures and pressures fitted inside the top of the connecting rod and a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, further rings made of a yielding synthetic material adapted for resisting high temperatures and pressures, and a piston pin fitted between the boss apertures including at least one elongated elastic element having ends which are carried in said further rings in said boss apertures, the medial section formed by said elements being fitted in the ring in the top of the connecting rod.

14. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, said bosses projecting to a very short extent beyond said inner skirt surface, and a composite piston pin constituted by a plurality of elements fitted between the boss apertures, at least one of said plurality of elements being an elongated elastic element having ends which are carried by said boss apertures, the medial section formed by said elements being fitted in the top of the connecting rod.

15. In combination with the combustion chamber and associated connecting rod of an internal combustion engine, the top of said connecting rod being provided with a bore and diametrically opposed grooves extending longitudinally in the surface of said bore, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss and a piston pin fitted between the boss apertures including a plurality of superposed flat elongated elastic elements having ends which are carried by said boss apertures, the medial section formed by said elements being fitted in the top of the connecting rod, the central flat element engaging edgewise grooves in the connecting rod bore.

16. In combination with the combustion chamber and associated connecting rod of an internal combustion engine, the provision of a piston carried inside said combustion chamber and adapted to automatically adjust the volumetric ratio in the latter and comprising a body, a skirt rigid with said body and two diametrically opposed bosses rigid with the inner surface of the skirt near the outer end thereof and each provided with a radial aperture facing the other boss, and a piston pin fitted between the boss apertures including at least one elongated elastic element having ends which are carried by said boss apertures, the medial section formed by said elements being fitted in the top of the connecting rod, keying rods fitted between the medial section of the said elements and the top of the connecting rod and further rods keyed between the walls of the apertures in the piston bosses and the ends of said elongated elastic elements.

17. In combination with the combustion chamber and associated connecting rod of an internal combustion engine, the provision of a piston in said combustion chamber adapted to automatically adjust the volumetric ratio in the latter and comprising a piston body including two diametrically opposed spaced bosses rigid with the body, each of said bosses having a radial aperture, the apertures being aligned and a flexible piston pin supported in the apertures in the bosses and extending therebetween, said piston pin being a composite body and including a plurality of elongated elastic elements at least one of which has ends accommodated in the apertures in the bosses, said connecting rod being connected to said piston pin intermediate the ends of the pin.

References Cited by the Examiner
UNITED STATES PATENTS

| | | | |
|---|---|---|---|
| 560,918 | 5/96 | Oderman | 123—78 |
| 722,146 | 3/03 | Robertson | 123—78 |
| 1,480,481 | 1/24 | Wakefield | 92—208 |

RICHARD B. WILKINSON, *Primary Examiner.*

KARL J. ALBRECHT, *Examiner.*